US008490087B2

(12) United States Patent  
Beaty et al.

(10) Patent No.: US 8,490,087 B2  
(45) Date of Patent: Jul. 16, 2013

(54) SYSTEM AND METHOD FOR TRANSFORMING LEGACY DESKTOP ENVIRONMENTS TO A VIRTUALIZED DESKTOP MODEL

(75) Inventors: Kirk A. Beaty, Hawthorne, NY (US); Rajdeep Bhowmik, Johnson City, NY (US); Andrzej Kochut, Hawthorne, NY (US); Junghwan Rhee, West Lafayette, IN (US); Hidayatullah H. Shaikh, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 12/629,248

(22) Filed: Dec. 2, 2009

(65) Prior Publication Data

US 2011/0131589 A1 Jun. 2, 2011

(51) Int. Cl.  
*G06F 9/455* (2006.01)

(52) U.S. Cl.  
USPC ................ 718/1; 719/318; 709/201; 709/219

(58) Field of Classification Search  
USPC ................. 718/1; 719/318; 709/201, 219  
See application file for complete search history.

(56) References Cited

U.S. PATENT DOCUMENTS

| 7,363,457 B1 * | 4/2008 | Dekoning et al. ............. 711/170 |
| 2003/0187617 A1 * | 10/2003 | Murphy et al. ................ 702/186 |
| 2008/0077366 A1 * | 3/2008 | Neuse et al. ...................... 703/2 |
| 2008/0235075 A1 * | 9/2008 | Couture et al. ................. 705/10 |
| 2008/0244062 A1 * | 10/2008 | Elangovan et al. ........... 709/224 |
| 2010/0100879 A1 * | 4/2010 | Katiyar .............................. 718/1 |
| 2010/0332629 A1 * | 12/2010 | Cotugno et al. .............. 709/221 |
| 2011/0035755 A1 * | 2/2011 | Huang et al. .................. 718/106 |

OTHER PUBLICATIONS

Beaty, K., et al. Desktop to Cloud Transformation Planning. IEEE International Symposium on Parallel & Distributed Processing, 2009. IPDPS 2009. May 2009. (8 Pages).

Rhee, J., et al. Deskbench: Flexible Virtual Desktop Benchmarking Toolkit. Mini-conference, the 11th IFIP/IEEE International Symposium on Integrated Network Management (IM 2009). Jun. 2009. pp. 1-8.

\* cited by examiner

*Primary Examiner* — Andy Ho  
(74) *Attorney, Agent, or Firm* — Tutunjian & Bitetto, P.C.; Louis Percello (57) ABSTRACT

A system and method for transforming a legacy device into a virtualized environment includes gathering profiling data over time to represent legacy device activities and analyzing the profiling data for system applications and user applications using a processor to determine usage frequency and resource requirements of at least one application. Captured user action events are benchmarked to simulate a user workload for the at least one application to determine how resource utilization and execution times scale from a legacy environment to a virtualized environment. One or more scaling factors are determined to produce a plan to provision for legacy services in the virtualized environment. The legacy system is transformed into the virtualized environment in accordance with the plan.

26 Claims, 9 Drawing Sheets

SYSTEM AND METHOD FOR TRANSFORMING LEGACY DESKTOP ENVIRONMENTS TO A VIRTUALIZED DESKTOP MODEL

BACKGROUND

1. Technical Field

The present invention relates to network services and systems, and more particularly to systems and methods for transforming legacy devices from a legacy environment to a virtualized cloud environment.

2. Description of the Related Art

Traditional desktop delivery models are based on a large number of distributed PCs executing operating system and desktop applications. Managing traditional desktop environments is incredibly challenging and costly. Tasks like installations, configuration changes, security measures, etc. require time-consuming procedures and dedicated deskside support. These distributed desktops are typically underutilized, resulting in low return on investment for these assets. Further, the distributed computing model for desktops also creates a security concern as sensitive information could be compromised with stolen laptops or PCs.

Desktop virtualization, which moves computation to a data center, allows users to access their applications and data using stateless "thin-client" devices and therefore alleviates some of the problems of traditional desktop computing. The basic concept of desktop virtualization is based on moving an operating system (OS) and application execution from local (at the user) device to a remote data center. The end user device becomes a lightweight computer that handles only a keyboard, a mouse and a monitor (as well as locally attached devices such as scanners and printers). Connectivity between the end-user device and desktop OS executing in the data center is handled using remoting protocols.

Enterprises can now leverage the flexibility and cost-benefits of running users' desktops on virtual machines hosted at the data center to enhance business agility and reduce business risks, while lowering total cost of operations (TCO). Recent research and development of the cloud computing paradigm opens new possibilities of mass hosting of desktops and providing them as a service.

Cloud computing is becoming an attractive option for providing desktop as a service. Some of the advantages include more economical, less operational expense, less risk of technology becoming obsolete, more access from anywhere from any devices, better data security (data on the server), and no management cost. However, there are existing legacy desktops that have applications, user personalization and data that have to be assessed and migrated to the new desktop in the cloud. Transformation of legacy systems to desktop clouds as well as proper capacity provisioning is a challenging problem. The desktop cloud needs to be appropriately designed and provisioned to offer low response time and a good working experience to desktop users while optimizing back-end resource usage and therefore minimizing provider's costs.

In cloud computing, services and computing resources are delivered to customers over the Internet from a service provider who owns and operates the cloud. Some of the characteristics of a cloud offering include dynamic scaling of infrastructure based on application needs, flexible usage based pricing, rapid service provisioning, multiple tenants coexisting on the same infrastructure and standardized offering capable of being subscribed to by a service offering catalog. Infrastructure as a Service (IaaS) is a cloud delivered service that includes resources delivered as a service including servers, network, memory, CPU, storage, etc. Desktop as a Service (DaaS) is a natural evolution of virtual desktop paradigm whereby desktops would be delivered as a service from a Desktop Cloud. DaaS provides benefits without the costs or risks of owning and managing physical resources and the added benefit of accessing desktops and desktop applications from any device at any location.

Customers who need a large number of desktops for their employees are no longer required to provision all of the required resources, such as servers and storage, but can transfer this task to a desktop provider and focus on business critical tasks instead. A desktop provider uses the concept of cloud computing to deliver a large number of desktops to its customers. A desktop cloud is simply a set of physical resources (such as storage, servers, networking gear, etc.) together with virtualization, connection brokering, and management software allowing for remote access to large numbers of desktops (potentially tens or hundred of thousands).

Desktop virtualization has several advantages over the typical "fat-desktop" approach. Management costs of the solution are significantly lower because operating system images, applications, and data are no longer installed on a large number of distributed systems but in a well controlled data center. This improves manageability of the system as well as data and application security. Moreover, since the local device is stateless it is very easy to troubleshoot and replace thus on-site labor is significantly reduced. The new desktop delivery model offers significant advantages. Due to effects of the economies of scale, the desktop cloud provider can optimize resource usage among large numbers of customers and therefore minimize unit cost of desktop delivery. Customers minimize exposure to rapid technology changes since they are subscribing to a desktop delivery service rather than purchasing technology.

Full realization of this paradigm requires further research. Important challenges still remain and include development of management approaches for scalable hosting of a very large number of virtual machines. Since the number of desktops is very large, standard management techniques developed for virtualized systems with server work-loads are not directly applicable. Another challenge is efficient graphics remoting which is a prerequisite to remote desktop access over wide area networks. In addition, transformation of legacy desktops to the cloud paradigm is an extremely difficult task. This is due to the scale and ubiquity of desktops in the enterprise as well as due to the significant complexity of desktop applications.

SUMMARY

A system and method for transforming a legacy device into a virtualized environment includes gathering profiling data over time to represent legacy device activities and analyzing the profiling data for system applications and user applications using a processor to determine usage frequency and resource requirements of at least one application. Captured user action events are benchmarked to simulate a user workload for the at least one application to determine how resource utilization and execution times scale from a legacy environment to a virtualized environment. One or more scaling factors are determined to produce a plan to provision for legacy services in the virtualized environment. The legacy system is transformed into the virtualized environment in accordance with the plan.

A system for planning and transforming legacy devices into a virtualized environment includes a user profiling module configured to gather profiling data over time to represent legacy device activities and analyze the profiling data for system applications and user applications to determine usage frequency and resource requirements of at least one application. The profiling module including a program application configured in software for collecting profiling data and running on a legacy device. A benchmarking module is configured to capture user action events to simulate a user workload for the at least one application to determine how resource utilization and execution times scale from a legacy environment to a virtualized environment. A transformation planner is configured to employ scale factors from the benchmarking module to produce a plan to provision for legacy services in the virtualized environment, and a transformation executor is configured to execute the plan to provide services for the legacy system within the virtualized environment.

The present disclosure presents tools and approaches that have been developed to facilitate fast and accurate planning for desktop clouds. Desktop workload profiling and benchmarking tools are provided as well as desktop to cloud transformation processes enabling fast and accurate transitions of legacy systems to a new cloud-based model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIGS. 5A, 5B and 5C shows plots of benchmarking results showing response time versus number of concurrent sessions for opening Acrobat Reader (5A), for opening a word processor document (FIG. 5B), while

DETAILED DESCRIPTION OF PREFERRED EMBODIMENTS

A system and method for transforming a legacy desktop to a virtualized desktop is described. The system/method overcomes the difficulties with respect to differences in workload characteristics and different varieties of desktop virtualization options that are available, such as, Virtual Machines, Shared Terminal Services applications, Application streaming, etc. Transformation of legacy desktop environments (i.e., a large number of distributed desktop computers) to a centralized model where desktop operating systems and applications execute on back-end servers or on the desktop compute cloud is a formidable challenge. Aspects of the present principles include: (1) collecting and gathering of user workload, (2) profiling and analysis of user workload, (3) providing knowledge about application category, importance, and business criticality as well as the interactiveness of the applications, (4) manually intervening for a person administering the cloud, (5) capacity planning of the virtualized system based on the results of the analysis and planning the transformation process including mapping of user groups and applications to centralized resources using the appropriate virtualization technologies such that user responsiveness is optimized and the total cost or operations (TCO) for a desktop cloud service provider is minimized, (6) benchmarking, validating, and executing the transformation plan, and (7) using the static placement plan and the virtualization technology as the final output, etc.

The present principles provide approaches, methods and tools for efficient and accurate transformation of legacy desktops to a desktop cloud. A desktop to desktop cloud transformation system includes a user workload analysis tool (user profile or UPROF™), a desktop performance benchmarking tool (DESKBENCH™) and a transformation method which uses workload analysis results and resource usage scaling factors obtained using benchmarking to assess needed capacity in a desktop cloud.

Capacity planning for desktop clouds is significantly different than server consolidation. Desktops represent non-aggregate single user workloads thus are much more bursty and unpredictable than the server based virtual machines. Moreover, since desktop applications use graphical based interaction, the resource usage as observed on a legacy laptop or desktop may be significantly different than that observed on a virtualized system. For example, replaying a movie usually leverages hardware acceleration in the graphics card. However, the same workload running within a virtual machine may require software based processing resulting in significant CPU (and potentially memory) consumption. Another aspect is a remoting protocol that can put significant strain on the network between a data center and "thin-client" devices. Because of this, appropriate estimates of amount of network bandwidth needed needs to be made by each of the desktop applications.

Since the complexity of the system is very high, the present approach combines analysis with empirical benchmarking to derive appropriate scaling guidelines. Based on the legacy desktop workload analysis, top applications used by users as well as resource usage are determined for each of them. Next, careful benchmarking of certain representative actions is performed within those applications on both the legacy and the virtualized system. Based on the benchmarking analysis, scaling factors are obtained, which permit for accurate estimation of needed capacity in the cloud.

A planning method for transformation of legacy desktops to cloud computing includes accounting for realistic scaling factors between application execution on legacy systems and execution on virtualized servers, providing a validation mechanism using benchmarking driven by realistic action sequences in workload analysis, estimating networking needs and effects of remoting protocol and network conditions based on user experience, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
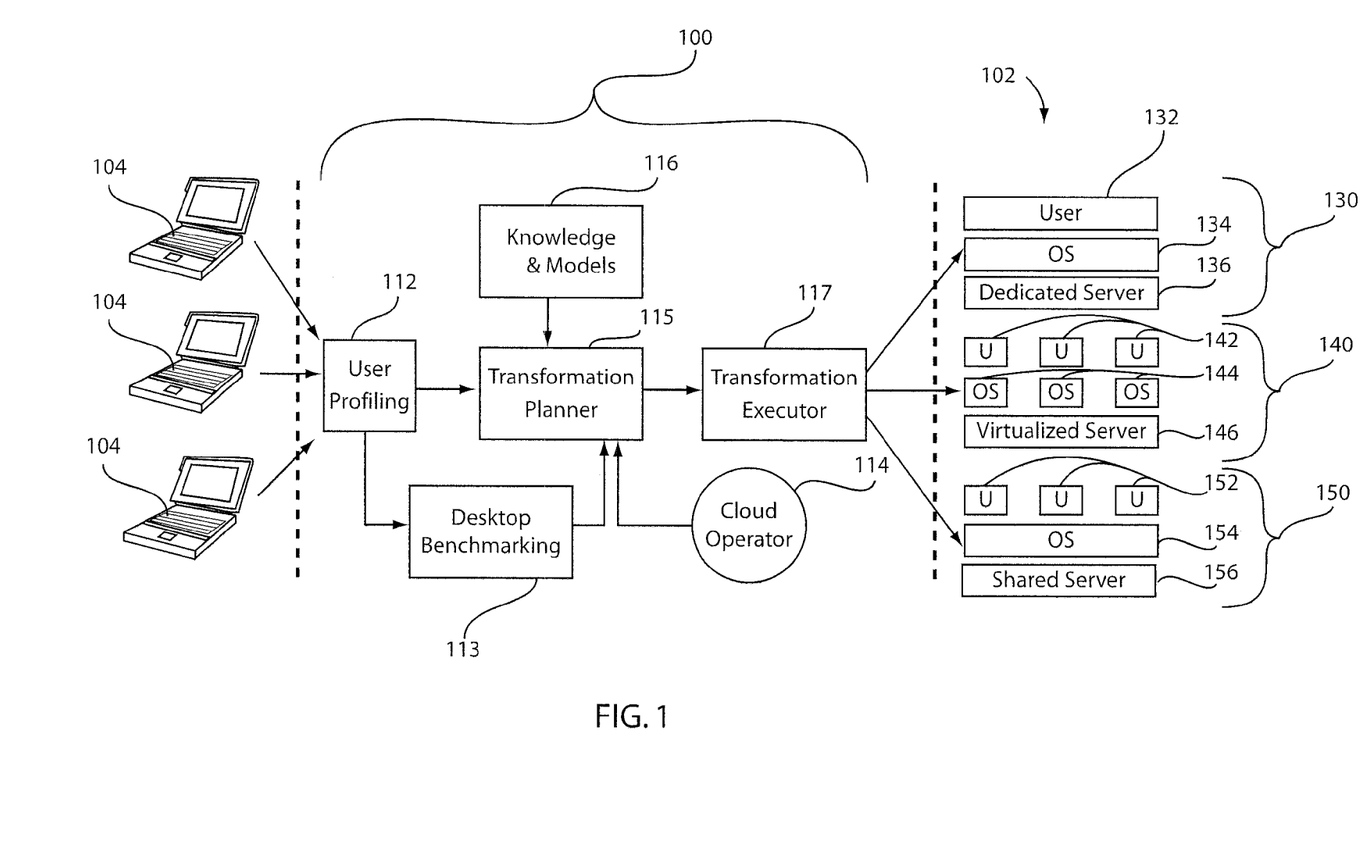
FIG. 1 is a block/flow diagram showing a transformation tool for planning and executing a transformation between a legacy system and a cloud architecture.

Referring now to the drawings in which like numerals represent the same or similar elements and initially to FIG. 1, a virtual client transformation and planning tool 100 is illustratively shown in accordance with the present principles. Tool 100 provides features for transformation planning for a desktop cloud 102. Moving legacy desktops 104 to the desktop cloud 102 has similarities to the transformation process of server consolidation. Server consolidation is about decoupling servers from the hardware that the servers run on so that they can be readily collocated or migrated to better optimize the utilization of the physical machines that host them. This aspect of hardware transparency is a shared objective of desktop clouds. The differences lie in the characteristics of the user interactions with servers and that of interactive desktop applications. Servers tend to be transaction based with aggregate user load that helps make their resource requirements more predictable. In contrast, user desktops are generally single-user and have unpredictable utilization requirements that correlate with the user's bursts of interaction, computing and "think-time". Further the applications are more interactive with graphical aspects that can create unique challenges when hosting desktops in the cloud 102.

When moving to the cloud both for server and desktop, transformation planning needs to be able to determine resource requirements and how best to allocate these to the physical hardware which hosts the resources. With desktop transformation planning, there are additional considerations over that of servers, both in what data is gathered from the legacy systems/desktops, and in what is done with this data to optimize the provisioning and placement within the cloud 102.

The transformation process of moving legacy desktops 104 to a desktop cloud 102 will now be illustratively described. Desktops 104 are enabled to gather profiling data which is collected for a period deemed long enough to capture a good representation of the user's desktop activities. This user profiling data is collected and analyzed in block 112. Output of this analysis provides profiling of both system and user applications—to determine key applications in terms of usage frequency and resource requirements. The list of key applications is passed to a desktop benchmarking component 113. This component 113 is capable of replaying captured mouse and keyboard events so as to simulate a real user workload. The applications determined to be key from the user profiling phase 112 are the ones which are benchmarked. Desktop benchmarking 113 provides an aspect of scaling to the planning process, and allows for repetitive execution of the desktop applications on different hardware while capturing precise timing of the completion of each event. This gives the necessary data to determine how resource utilization and execution times will scale from one hardware platform to another. This scaling data along with resource utilization data from the user profiling phase 112 are both used by a cloud administrator 114 when running a transformation planner 115. In addition to these data streams, the transformation planner 115 uses models and knowledge based rules 116 to help guide allocation of user desktops to the cloud 102.

Benchmarking module 113 obtains accurate scaling factor information based on running a workload mix of the legacy desktops 104 on the target virtualized environment 102. The scaling factors are advantageously computed based upon actual measurements of the legacy systems.

The transformation planner 115 produces as output a plan that directs a transformation execution component 117 to provision and place legacy desktop images onto hardware within the desktop cloud 102. There are various options 130, 140, 150 available for the placement of desktops 104 within the cloud 102. A shared services option 150 uses a server 156 and a single operating system (OS) 154 to host many users 152. Since there is a single copy of the OS 154, it can be the most dense by hosting the most users 152 per physical machine. When more autonomous access is necessary by users who require administrator access to the operating system or who use application libraries which are not readily shared by more than one user, a virtual machine desktop model 140 may be needed. This gives each user 142 their desktop running in their own virtual machine with the ability to have full administrative access with a virtualized server 146. Virtual desktops are viewed as less dense in that each user runs a copy an operating system 144 which consumes more resources of the physical machine than in an equivalent shared services installation. In an extreme case where there are exceptional resource requirements, such as heavy use of graphics processors for 3D rendering by a user 132, a dedicated 1-to-1 instantiation of a user desktop to a physical host (dedicated server 136 and operating system 134) may be necessary.

User Profiling 112: The transformation planning is only as good as the data which guides the planning decisions. For the case of planning for moving desktops 104 to the cloud 102, a user profiling tool named UPROF™ has been implemented for user profiling in block 112. Profiling of desktop users includes obtaining fine grain detail on resource utilization for both system and user application processes. Planning for desktop transformation needs to look at application level resource statistics. Knowing which applications are running as well as the resources that are used needs to be determined. This data along with the knowledge 116 of characteristics of specific applications as to whether they have graphics rendering requirements, or whether they are able to shared amongst multiple users in a shared services delivery model, go together to decide on possible placement alternatives. Since not all activity on desktop machines 104 is related to user activity, for instance off-shift backups or other system utilities, the profiling tool 112 needs to collect data at all times the desktop is in operation.

UPROF™ (112) was designed to run as an agent on the desktops 104 to be able to gather detail for all processes and more importantly so that it could collect data regardless of whether the desktop 104 was connected to the network or not. UPROF™ was written for the windows operating system, as this covers the majority of the desktop population, but it could be easily extended to include Linux/Unix or other operating systems. In this example, UPROF™ uses the Microsoft Windows Management Interface™ (WMI) to obtain the statistics of interest. These may include: number, speed, type and utilization of processors; size and utilization of memory; size and utilization of local disks; utilization of network interfaces; names, user/owner, command line arguments, utilization of CPU, memory, network for all processes; etc. The data may be collected by default, e.g., on a 10 second interval. This frequency allows spikes in utilization to not be missed—not be averaged out by having a longer time period, although other settings may be employed.

UPROF™ 112 collects data even when the desktop machine 104 is disconnected from the network. Knowing about all activity whether user initiated or system processes, including batch tasks that may run off-shift (e.g., system backups) is needed in understanding the full resource usage story in the planning for operations in the cloud 102. UPROF™ 112 gathers the 10 second samples locally into uploadable data sets of greater time periods, (e.g. hourly), at which frequency these data sets are uploaded to a collection server or the like (in block 112). If the desktop machine 104 is unable to communicate via the network to this server (112), the data is stored and uploaded on a subsequent attempt when connectivity is re-established.

The collection server (112) may be implemented as a virtual appliance. This appliance runs a web server to allow for both installation and data collection functions. The UPROF™ agent 112 is published via the web server so that it can be easily downloaded and installed on the desktop machines 104. Then, as data is collected, the agent uses, e.g., CURL, an http-based upload utility, to connect to the appliance and deposit the data. The use of HTTP uploads avoids issues with firewalls that might otherwise be obstacles to connecting to the UPROF™ appliance (112)—at minimum it avoids additional custom configuration that would be required to use proxies or the equivalent.

If there are large numbers of desktops being transformed to the cloud 102, it is recommended to run the UPROF™ agent (112) on a representative set of desktops. In an enterprise, the desktop users can be categorized into a handful of user types, e.g., Administrator, Developer, Customer Representative, Business Manager, etc. Taking a set of 10-20 users of each category is a preferred usage scenario. The time period for collecting UPROF™ data may be on the order of a few weeks, this is to help ensure that a complete set of user activities for each user category are included in the data.

Having gathered all of the data, analysis is run for the aggregate as well as on each category of user so that the desired detail is produced and passed on to the downstream components of the transformation process. Specifically, the names, frequency and resource utilization of the applications and system processes are determined. This list determines the top applications to be included in the benchmarking phase 113 and the resource requirements are needed for the transformation planner 115 to guide the provisioning and placement of the desktops within the cloud 102. These resource requirements include system configuration details also gathered by the UPROF™ agent 112, such as disk, memory and CPU characteristics to name a few. UPROF™ 112 provides the necessary profiling and analysis data of the legacy user desktops 104 to be able to make decisions on how best to reconstitute these desktops 104 in a desktop cloud instance or option (e.g., options 120, 130, 140). By identifying details at a process level, not just at a system wide level as is done for server consolidation transformations, the desktop transformation planning (115) is able to construct plans to migrate to multiple models of cloud desk-tops. This includes using shared services modes of operation 150 for applications that can be supported in this manner, while using virtualized desktops 140 in other cases where more complete access control may be required by the user. A composite or hybrid solution may be designed as well, e.g., where a virtual machine serves the user's desktop and that desktop has icons which launch streamed or served applications running on a shared services instance. This decision making is the role of the transformation planner 115 using data from UPROF™ 112, knowledge and models 116 and the desktop benchmarking 113.

Desktop Benchmarking 113: In addition to knowing what resources are needed to support a desktop and all of its applications, scaling factors related to running on new hardware and software are used to be able to plan accurately for desktop cloud transformations. A multi-core, multi-processor, e.g., LPARS, is intermixed with virtualization technologies of different implementation levels (which makes it more difficult to provide scaling by use of tables of specification data). The multi-processor calls for realistic benchmarking of before and after configurations to obtain the performance and utilization measurements that will allow for accurate scaling computations to be made.

DESKBENCH™ (113) is a tool that we have developed to perform the user benchmarking described. It is a desktop bench-marking system 113 capable of replaying and timing previously recorded user actions. These recorded actions, specifically keyboard and mouse events, are stored as artifacts. Artifacts are combined into playlists so that a set of actions can be played back, with directives included for controlling repetitions, random or fixed think times, and random or sequential order. When playing back, the tool 113 matches screen buffer regions to determine exactly when one action has completed so that it can proceed to the next. The tool 113 works in two phases: recording of user actions and replaying them against a system of interest.

When recording in the benchmarking phase 113, the keyboard and mouse-click events sent to the application are captured and saved into an artifact file. If requested, user "think-times" (the amount of time between user actions) are recorded in the artifact to permit later playback to be run at the actual recording speed. Further, during recording synchronization, points can be marked using a defined key sequence (e.g., prtScr key) and saved as part of the artifact. These synchronization points are used during playback to direct DESKBENCH™ (113) to wait for a specified screen image state to be reached before proceeding. These can be marked at points where either precise execution time measurements are desired to be reported, or at points where it is deemed necessary for proper playback. An example of the latter case is the point following a double-click event to open an application window—at which point the application window fully opens and gets focus prior to performing actions within the window. The tool user signals the synchronization point with the defined key sequence and is prompted to mark a rectangular region of the desktop screen image as the image region that represents the expected completion state for the current event. This marked image region is stored along with the artifact and is used by DESKBENCH™ (113) during the playback phase to determine precisely when the full response is complete for the prior action and when to move on to the next event in the artifact playback. Therefore, a synchronization point represents a screen state that is the logical end of a set of events and is either a necessary or desired point to reach before proceeding with subsequent actions.

The recorded artifacts can be replayed individually or combined in a playlist where further controls are available to allow execution of a realistic desktop user workload on a computing platform of choice. Specifically, when replaying, DESKBENCH™ (113) processes each keyboard and mouse event found in the given artifact file sequentially and injects these into the window manager. At the same time as events are being injected, DESKBENCH™ (113) is monitoring the returned screen updates to detect event completion at each of the recorded synchronization points.

Figure 2:
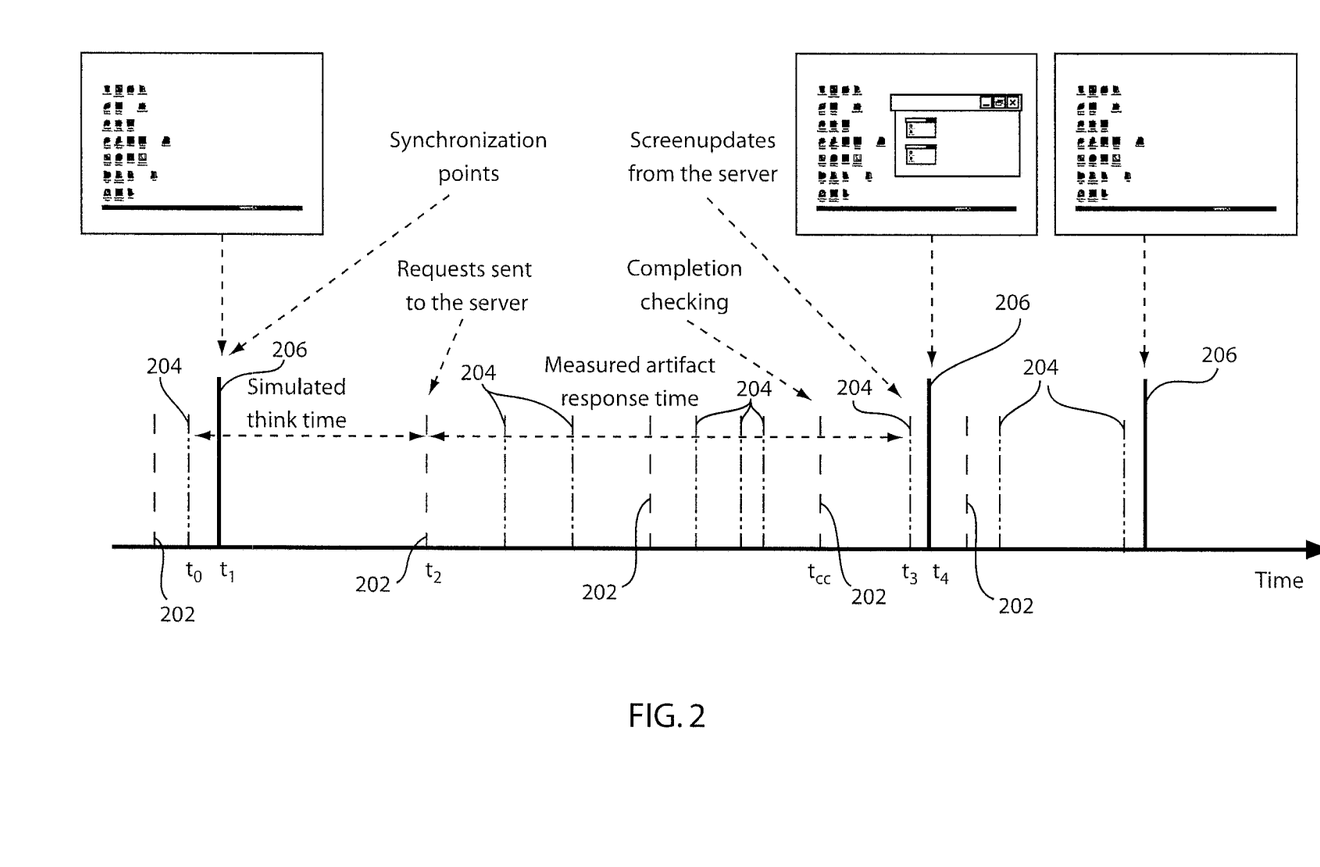
FIG. 2 is a diagram showing a benchmarking process for transformation of a legacy system to a cloud architecture.

Referring to FIG. 2, a playback process is depicted on a horizontal time line. Lines 202 represent requests sent from the client 104 to the desktop (102) running on a server. Lines 204 represent responses arriving from the server. Lines 206 represent synchronization points when the observed screen states are compared with the expected one until a match occurs, signaling event completion. Assume that a prior artifact finished at time t0 (which is the time of the arrival of the last response associated with that artifact). Periodic screen checking occurs at t1. At each synchronization point 206, the playback process detects event completion by watching for a screen region match with the region stored with the artifact for the current synchronization point 206. A playlist file provides a specification of user think-time to control the speed that events are replayed. Since recorded synchronization points 206 keep playback synchronized, the introduction of think-times are only to make the generated workload compare to that of a real desktop user.

There are two outputs of DESKBENCH™ (113) that are of interest to the benchmarking for desktop cloud transformation planning: 1) automated execution of user desktop workloads used in loading the system of interest and 2) the measurement of execution times for the desktop events replayed there. For the latter, as DESKBENCH™ (113) plays back artifacts it captures precise timing for each of the groups of events represented by a synchronization point, and reports these for use in subsequent performance and scaling analysis. By capturing performance data (along with resource usage)

from replaying the same set of representative user workload artifacts on both the old and new configurations, an accurate scaling factor can be computed.

For example, the use of scaling factors may include the following. The user profiler 112 monitors the legacy desktops 104 and obtains list of applications being used with a fraction number of the users using them and a fraction of time the application is used in each users' workload. A list of top applications is composed in terms of usage frequency. Benchmarking of applications is performed in block 113. The benchmarking involves replaying typical sets of actions within each application using the DESKBENCH™ tool 113. As a result, resource utilization data is gathered on a target virtualization server in relation to load intensity in a given application to obtain scaling factors. Aggregate usage of a resource (e.g., CPU) on a target virtualized platform is computed as, e.g., as a linear combination of application usage frequencies and the scaling factors.

Computing resource requirements for a virtualized system and desktop placement will now be described. To perform proper capacity planning for a desktop cloud 102, scaling factors are used for resource usage and then observed usage is appropriately scaled on legacy systems. These scaling factors are preferably computed by the transformation planner 115. Scaling factors for a given application a and resource r are defined as a ratio of amount of the resource used by an application while executing in the cloud 102 and amount of the resource needed when executing on a legacy desktop 104. The ratio is determined based on comparing resource usages in both environments when executing the same action within the application. For example, opening identical documents in a text editor or moving to the next page of the document. In one embodiment, a single scaling ratio is employed for an application based on an arithmetic average of scaling ratios for several actions with the application. Examples of scaling factors are presented below. To compute resource requirements scaling factors are used in conjunction with frequency of application usage and observed resource usage on legacy desktops 104.

After resource requirements have been established, virtual desktops on servers are placed in the cloud 102 by the transformation executor 117. This may be performed using standard techniques, such as a bin-packing algorithm where item sizes correspond to resource requirements of virtual desktops.

Examples

To illustrate concepts described herein examples are now presented. The examples are intended to demonstrate utility of the present tools and a use case.

Figure 3A:
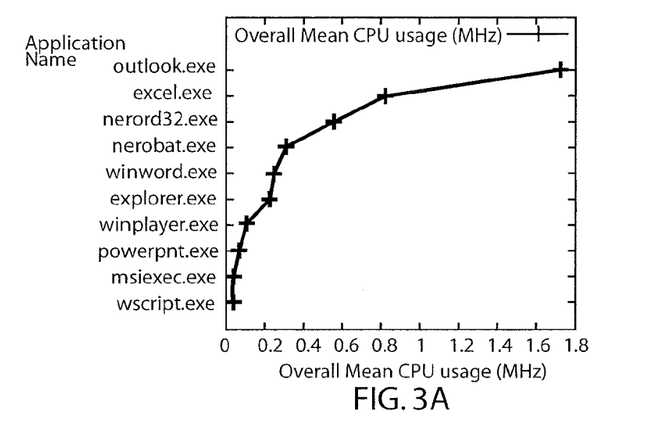
FIGS. 3A-3E show illustrative plots employed in profiling workload data, wherein the plots present application rankings with respect to: overall CPU usage (FIG. 3A, application loading (FIG. 3B), memory usage (FIG. 3C), read transfer rate (FIG. 3D) and write transfer rate (FIG. 3E)
Figure 3B:
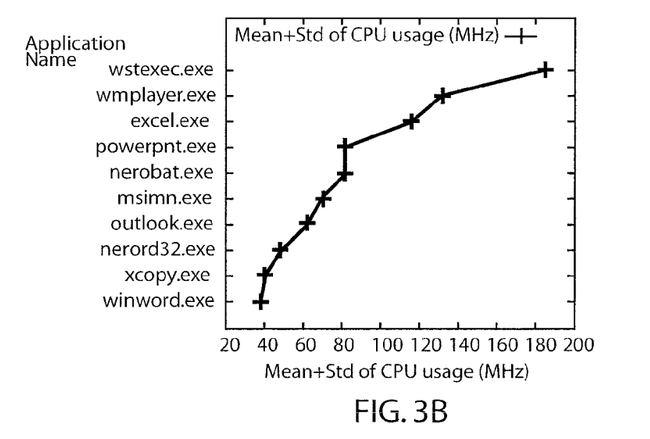
Figure 3C:
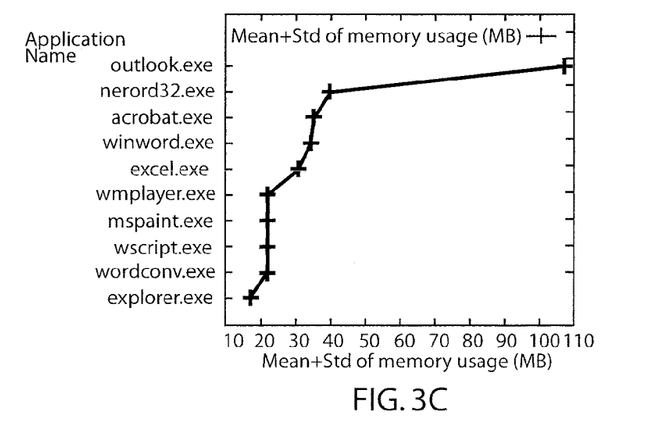
Figure 3D:
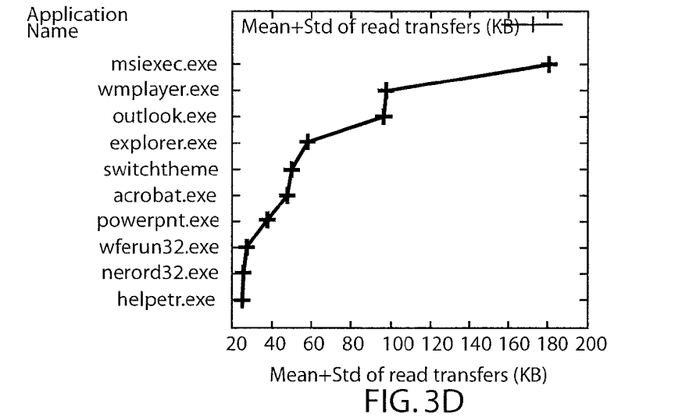
Figure 3E:
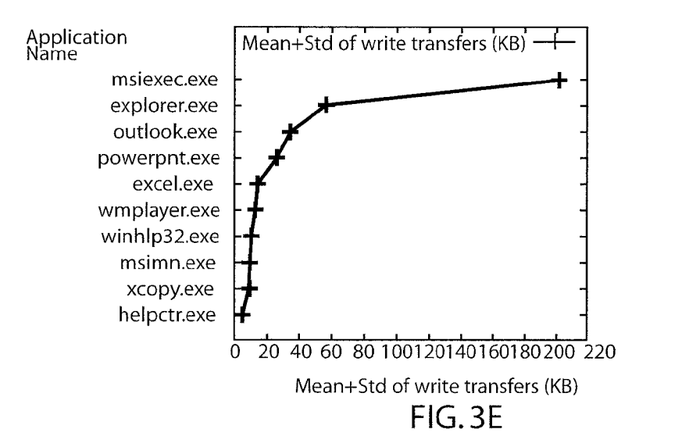

Referring again to FIG. 1, a desktop workload analysis gives a detailed view of activity on legacy systems 104. There are several outputs from the user profiling tool 112. For each of the user groups, we generate a list of top applications based on resource usage for key resources. An example of such output is presented in FIG. 3. The X-axis on each of the plots represents resource usage. FIG. 3A presents the top 10 applications with respect to CPU utilization over the measurement period and reveals applications with large cumulative CPU usage, which need to be considered in cloud capacity planning. FIG. 3B presents the top 10 applications with respect to CPU consumption when the application is loaded in memory. This ordering reveals applications that are high consumers of CPU but are not necessarily running often. As can be noted from the plots the two lists are different. The second one (from FIG. 3B) finds peak usage applications. FIG. 3C shows top applications with respect to memory usage, while FIGS. 3D and 3E show top applications with respect to read and write transfers.

Figure 3F:
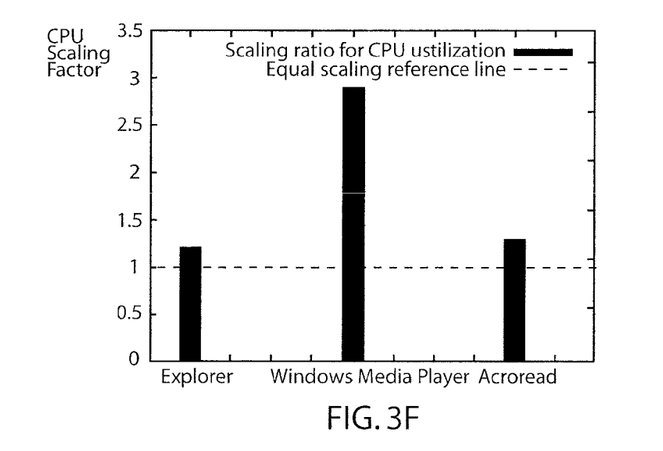
FIG. 3F is a plot showing an example scaling factor for CPU usage of Windows Explorer™, Windows Media Player™, and Acrobat Reader™ on a legacy laptop and virtualized desktop (VMWare™—virtual machine)

The present method obtains scaling factors for resource usage on legacy and virtualized systems. A plot in FIG. 3F shows example scaling factors for three test applications. The Y-axis represents a ratio of CPU usage in a virtualized environment and a ratio of CPU usage on a legacy desktop. In both cases the same Windows XP image was employed acting as desktop OS (on the laptop and within the virtual machine). In the presented example of FIG. 3F, Windows™ media player needed almost three times more CPU resources on the virtualized system than on the legacy laptop. Other applications have very small virtualization overheads.

Figure 4A:
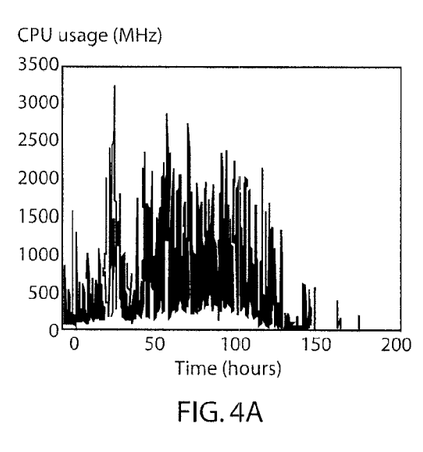
FIG. 4A is a time series of aggregate CPU usage for all desktops.
Figure 4B:
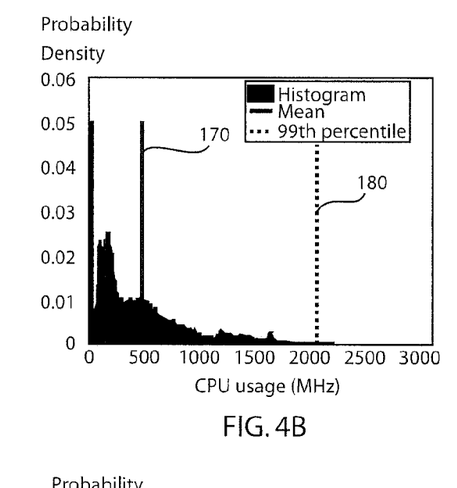
FIG. 4B is a corresponding histogram of the data in FIG. 4A.
Figure 4C:
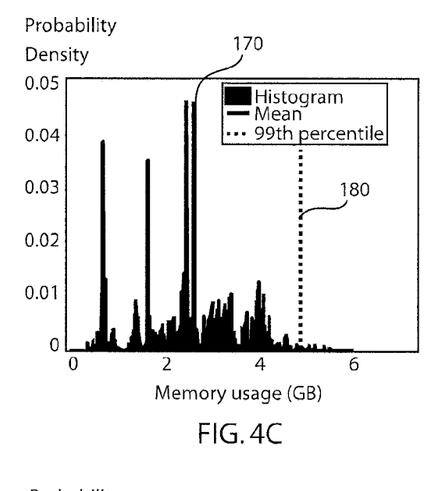
FIG. 4C is a histogram of aggregate memory usage.
Figure 4D:
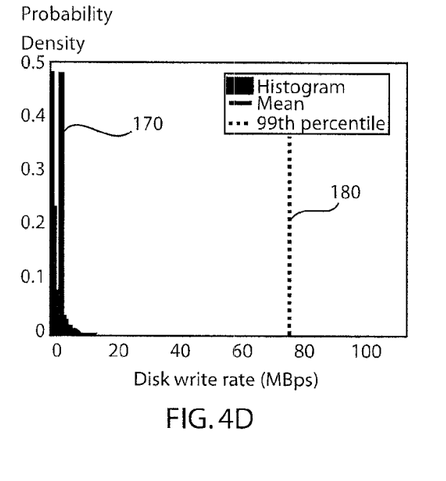
FIG. 4D is a histogram of aggregate disk write transfers.
Figure 4E:
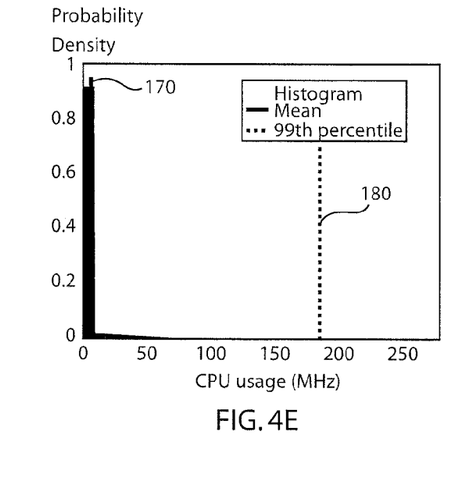
FIGS. 4E and 4F are plots respectively illustrating CPU and memory usage histograms for a single application across all users.
Figure 4F:
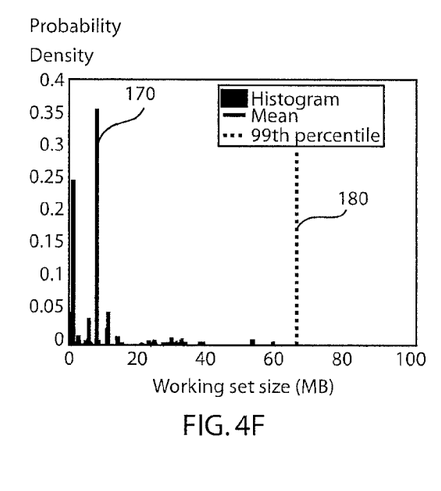

Another aspect of capacity planning for desktop cloud is aggregate usage of resources for a given user group. To illustrate, aggregated workload from nine workstations was collected. FIGS. 4A, 4B, 4C, and 4D present aggregate resource usage for all workstations for CPU, memory, and disk write rate. FIG. 4A shows a time-series of aggregate CPU utilization and FIG. 4B shows a corresponding histogram. Histograms also show mean resource usage 170 as well as the 99th percentile 180. Those values are used as estimates of aggregate resource consumption to be expected in virtualized environments and may be scaled using benchmarking scaling factors. FIGS. 4E and 4F present resource usage due to a single application across all of the users. This information is used in case of provisioning a shared services environment (in which a given application, such as Microsoft Office™, is delivered to all of the users from a shared server).

Benchmarking for capacity planning: Knowledge of applications that are running on legacy desktops as well as their resource requirements is only one element of desktop cloud capacity provisioning. The existing workload (as observed on laptops and desktops) is of concern as well and will scale on virtualized system (for example, VMware ESX servers). It is very difficult to determine existing workload analytically. There is a multiplicity of factors affecting scaling. The most important ones may include the type of CPU, type of virtualization technology and related hypervisor overhead, hardware acceleration for graphics, network requirements of the remoting protocol, etc.

Accounting for all of these factors in an analytical model is a challenging task. Therefore, we take another approach and benchmark applications (e.g., key actions within those applications) on a target virtualized platform as well as on the legacy desktops. As a result, we can obtain reliable scaling factors for resource usage as well as sensitivity analysis to establish maximum capacities of servers.

Figure 5A:
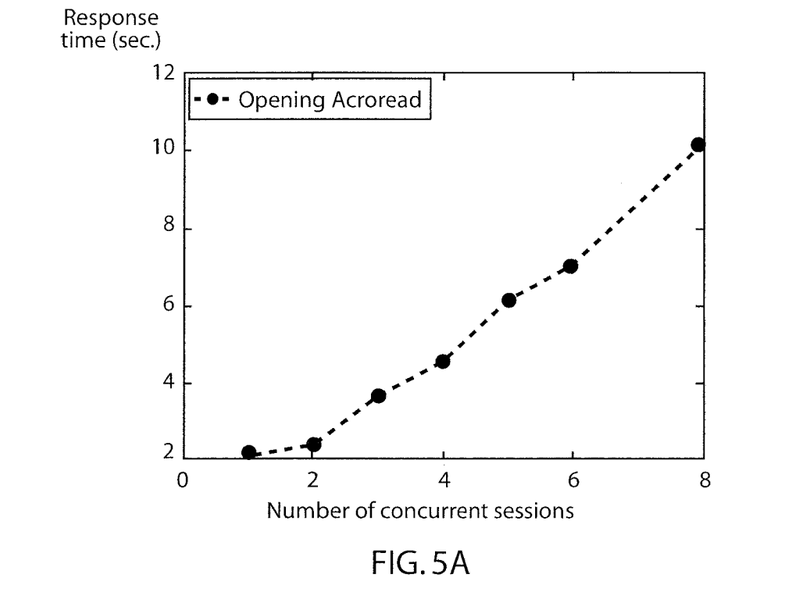
Figure 5B:
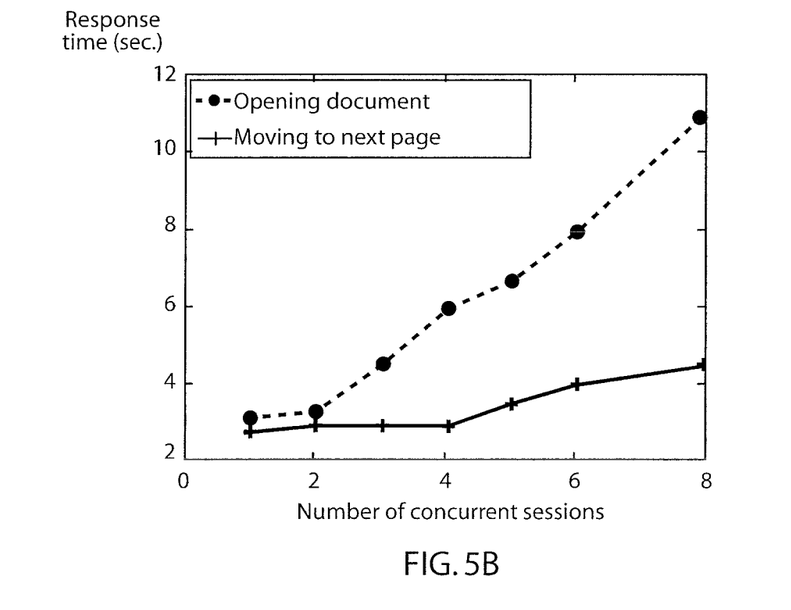
Figure 5C:
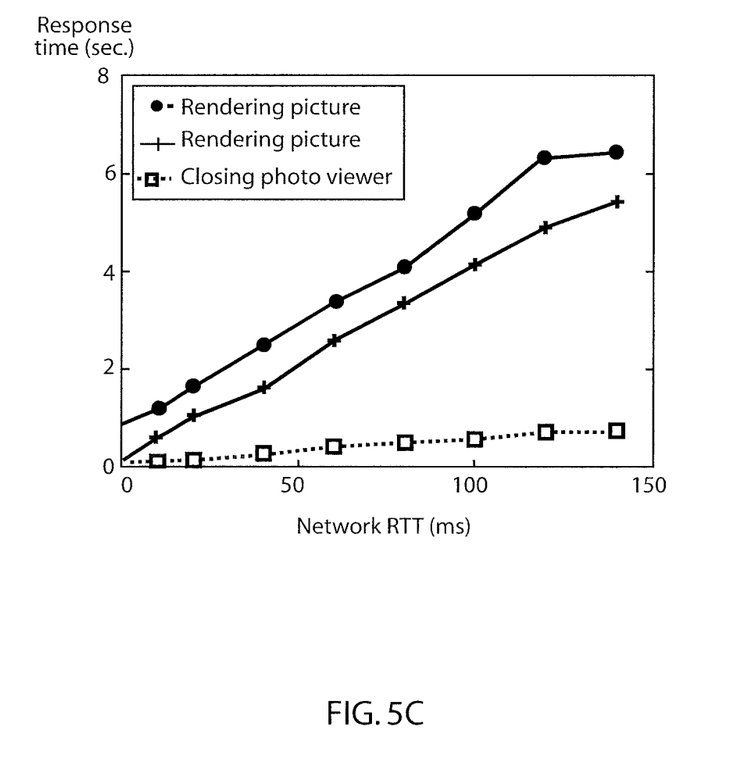
FIG. 5C shows effects of network latency on responsiveness.

Referring to FIG. 5, example results of benchmarking experiments for a set of applications are illustratively depicted. The results should not be treated as capacity statements about the achievable densities in virtual client environments but rather as illustrative examples of the present approach. FIGS. 5A and 5B have an x-axis representing a number of concurrent sessions on a single CPU core executing an action, and a y-axis representing mean response time of this action at a given concurrency level. FIG. 5C has an x-axis representing network latency, and a y-axis representing mean response time of this action at a given latency level.

FIGS. 5A and 5B show responsiveness of opening an ADOBE ACROBAT® program and word processor document as well as moving to the next page of a document, respectively. FIGS. 5A and 5B show how sensitive operations are to the concurrency and an acceptable density of operations per core to maintain a given responsiveness. FIG. 5C presents effects of latency on responsiveness of rendering a picture.

Note that picture rendering is significantly affected because of significant network transfers. This illustrates how DESK-BENCH™ can be used to estimate how far (in terms of network latency and bandwidth) user terminals can be from the virtualized servers to maintain desirable level of response time.

Figure 6:
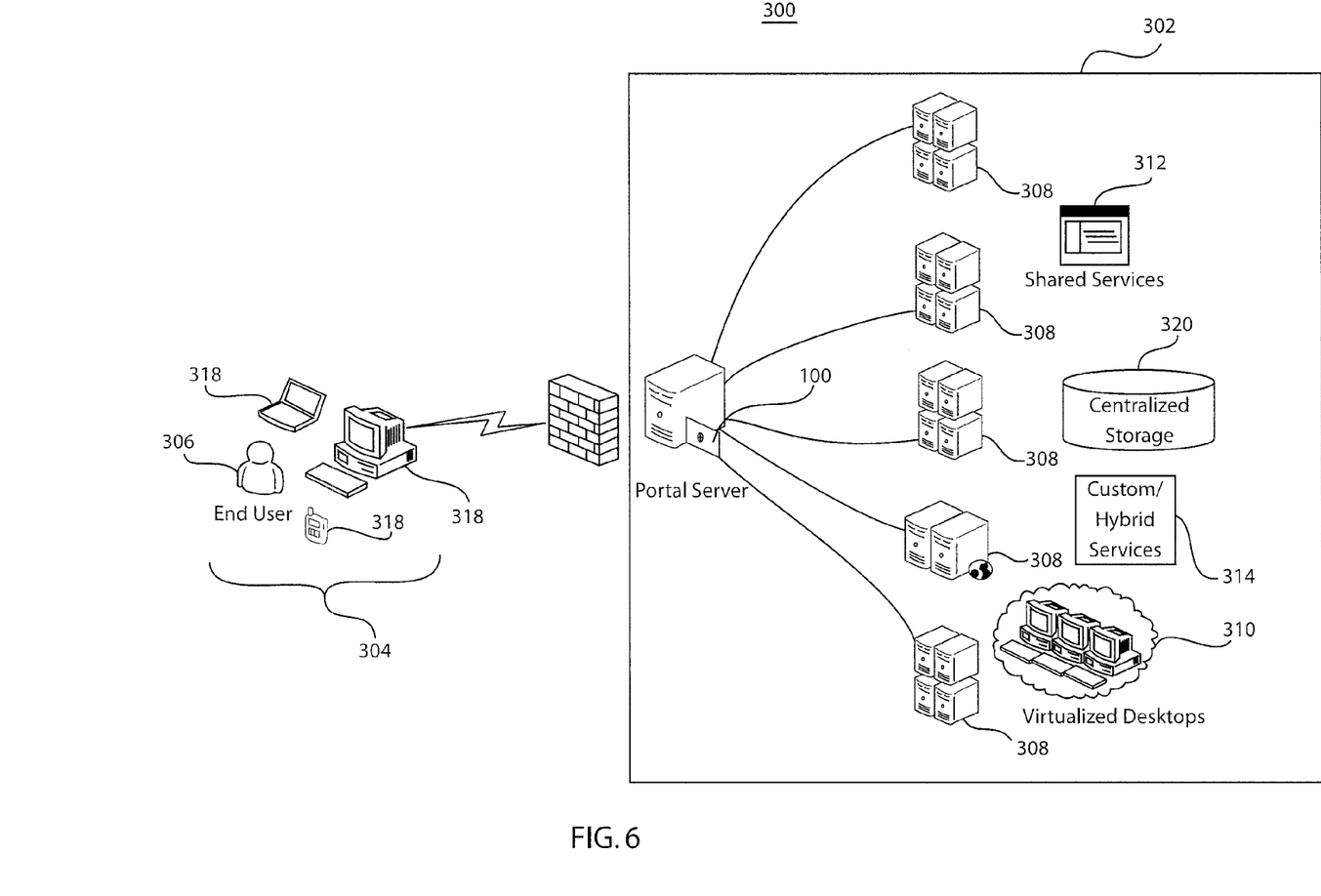
FIG. 6 is a block diagram showing a network system interfacing legacy devices with a cloud architecture.

Referring to FIG. 6, a network 300 includes a computing cloud architecture 302 and a legacy system 304 employed by a user 306. Cloud architecture 302 includes a plurality of servers 308 each having the ability to provide one or more network services. For illustrative purposes, the servers 308 may include terminal servers, web servers, JAVA™ servers, Citrix™ Servers or any other type of servers. The servers 308 may provide virtualized desktop services 310, shared services 312, customized or hybrid service 314, etc. Tool 100, as described above, may be included in one or more of servers 308 and/or a portal server 316. Tool 100 is configured to analyze user profiles, workload, resources, etc. as described above to provide a transformation between legacy devices 318 (e.g., computers, laptops, cell phones, personal digital assistants, etc.) or networks 320.

The tool 100 provides a unified solution for desktop virtualization of legacy systems 304 through discovery and statistical analysis of application usage patterns on the legacy systems 304. The tool 100 gathers fine-grained resource usage data from sample groups of workstations and performs statistical analysis on observed activity (e.g., pilots engagement with UBS in progress). Tool 100 permits a choice of suitable virtualization technologies, and through analysis of an application portfolio can plan the delivery method for each application. The technologies may be selected based on a plurality of different criteria including based on a cost/benefit analysis.

Tool 100 provides for efficiency in dealing with workloads and tasks. For example, user clustering and workload disaggregation is performed by identifying user groups, subdividing workstation workloads into parts served by different technologies, etc. Required capacities are estimated for each of the virtualization technologies involved to provide a basis for load sharing.

Disaggregation of the desktop workload to multiple virtualization technologies includes taking a set of legacy applications and running them in multiple technologies in the virtualized environment 102. Providing the virtualized technologies permits the grouping of functions and features to make the overall system more efficient by better utilization of system resources. By disaggregating the legacy device, a same set of services may be delivered to a user of the legacy device by employing multiple virtualization technologies. This is preferably transparent to the user. The virtualized technologies selected for a legacy user would be selected based on a best fit as to the types of services and needs of the user. Other considerations may be efficiency, performance, etc. Disaggregation decisions may be based upon knowledge and models information 116 in FIG. 1. Models 116 may be created to assist in determining the best way to perform virtualized jobs to meet the user's expectations and meet user or other requirements. For example, a best method for running three different applications for a plurality of user (on legacy systems) may be to separate each application task among three different servers in the virtualized environment, or in an alternative two of these applications may be run on a first server and the third application may be run on a dedicated server, etc.

Benchmarking and validation of application performance on virtualized systems is provided by tool 100. The tool 100 creates representative action sequences for dominant applications. The action sequences are replayed against legacy and the virtualized systems to obtain performance scaling factors. Then, effects of network latency are analyzed. Performance evaluation may be assessed to create standard industry or system benchmarks for desktop virtualization. In addition, a migration plan and execution of actual desktop transformation may be determined and provided by tool 100.

Tool 100 is provided at a server or service provider's location 302. Tool 100 may include a desktop virtualization server (308) to provide service 310. Services 310 may utilize a plurality of technologies and/or services. Shared services 312 may include applications that execute on terminal services servers 308, e.g., WTS, Citrix. Applications are preferably "wrapped", which means taking a legacy application and wrapping the legacy application with an interface compatible with a virtualized computing environment. Shared services 312 are configured to permit a high density of users per server.

Desktop virtualization includes generating virtual desktops on user machines 318. These machines 318 may include a computer device, a cellular telephone, a laptop, a personal digital assistant, etc. Each desktop of the user machines 318 executes in a dedicated virtual machine (VM), e.g., XenSource, VMware. This feature makes the system very flexible, with no problems with application conflicts, and full control over the user's operating system (OS).

Applications for the legacy system 304 are streamed to end user device 318 from to virtualized desktop 310. Application may be provided to subscribers and access may be limited based on the type of the user and the user's subscription. Tool 100 provides different virtualized desktop environments equipped with combinations of applications for use by the legacy system 304, which are made to appear as a personal computer desktop or a web browser.

Tool 100 is particularly useful in transforming legacy desktops to a desktop cloud model (or a virtualized desktop environment). Transformation includes assessment of workload on legacy machines which permits computation of aggregate resource usage for target user groups followed by benchmarking of a target virtualized environment geared to obtain resource scaling factors, e.g., how many more CPU cycles will an application execution need on a virtualized system than on the legacy desktop. Benchmarking also performs analysis of how sensitive remote desktop response time is to network conditions, such as bandwidth and latency. Workload analysis combined with targeted benchmarking allows accurate estimation of capacity needed in a desktop cloud for a given user population. Execution involves creating virtual machines based on desktop drive images, integrating with cloud management and provisioning as well as transfer of associated user data.

Figure 7:
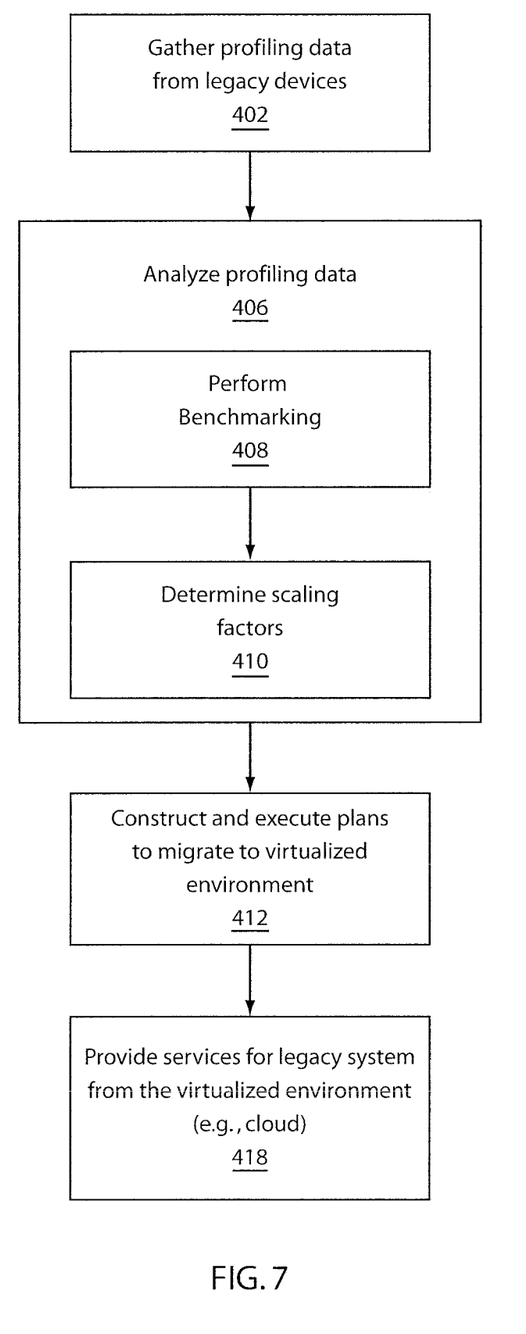
FIG. 7 is a block/flow diagram showing an illustrative method for transforming legacy devices into a virtualized environment.

Referring to FIG. 7, a block/flow diagram shows an illustrative system/method for transforming legacy desktop environments to a virtualized desktop model. In block 402, profiling data is gathered over time to represent legacy device activities. The profiling data includes, among other things, gathering information from a representative number of legacy devices (if a large number of devices are present). This may include categorizing the devices (e.g., shared services, office, home use, etc.). Profiling data may include application level resource statistics of the legacy system including at least one of characteristics of specific applications; number, speed, type and utilization of processors; size and utilization of memory; size and utilization of local disks; utilization of network interfaces; names, user/owner, command line arguments; utilization of computer processing unit, memory, and network for all processes, etc.

In block 406, the profiling data is analyzed for system applications and user applications using a processor to determine usage frequency and resource requirements of at least one application. The profiling data analysis will be employed to construct plans in block 412 to migrate to one or more models in the virtual environment from the legacy devices based upon the profiling data. This may be performed by a transformation planner. The multiple models may include a shared services model, a virtualized desktop model, a dedicated server model, etc.

The analysis ob block 406 includes benchmarking in block 408. Benchmarking captures user action events to simulate a user workload for the at least one application to determine how resource utilization and execution times scale from a legacy environment to a virtualized environment. The benchmarking includes recording and replaying user events to match screen buffer regions to playlists to determine when a user action has completed to proceed to a next action.

In block 410, one or more scaling factors are determined to produce a plan to provision for legacy services in the virtualized environment. The scaling factors may be determined based on performance and utilization measurements in the profiling data. The performance and utilization measurements in the profiling data may include stored artifacts of user events and times between events. In block 412, the transformation plan is constructed and executed. In block 418, services for the legacy system are provided within the virtualized environment. This may include disaggregating a legacy device and delivering a same set of services to a user of the legacy device by employing multiple virtualization technologies.

Having described preferred embodiments of a system and method for transforming legacy desktop environments to a virtualized desktop model (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transforming a legacy device into a virtualized environment, comprising:
   gathering profiling data over time to represent legacy device activities;
   analyzing the profiling data for system applications and user applications using a processor to determine usage frequency and resource requirements of at least one application;
   benchmarking captured user action events to simulate a user workload for the at least one application to determine how resource utilization and execution times scale from a legacy environment to a virtualized environment;
   determining one or more scaling factors to produce a plan to provision for legacy services in the virtualized environment; and
   transforming the legacy device into the virtualized environment in accordance with the plan.

2. The method as recited in claim 1, wherein gathering profiling data includes determining application level resource statistics of the legacy system including at least one of: characteristics of specific applications; number, speed, type and utilization of processors; size and utilization of memory; size and utilization of local disks; utilization of network interfaces; names, user/owner, command line arguments; utilization of computer processing unit, memory, and network for all processes.

3. The method as recited in claim 1, wherein gathering profiling data includes gathering information from a representative number of legacy devices.

4. The method as recited in claim 1, further comprising constructing plans to migrate to multiple models in the virtual environment from the legacy devices based upon the profiling data.

5. The method as recited in claim 4, wherein the multiple models include a shared services model, a virtualized desktop model, and a dedicated server model.

6. The method as recited in claim 1, further comprising disaggregating a legacy device and delivering a same set of services to a user of the legacy device by employing multiple virtualization technologies.

7. The method as recited in claim 1, wherein determining one or more scaling factors includes determining scaling factors based on performance and utilization measurements in the profiling data.

8. The method as recited in claim 7, wherein the performance and utilization measurements in the profiling data include stored artifacts of user events and times between events.

9. The method as recited in claim 1, wherein benchmarking includes recording and replaying user events to match screen buffer regions to playlists to determine when a user action has completed to proceed to a next action.

10. A computer readable storage medium comprising a computer readable program for transforming a legacy device into a virtualized environment, wherein the computer readable program when executed on a computer causes the computer to perform the steps of:
    gathering profiling data over time to represent legacy device activities;
    analyzing the profiling data for system applications and user applications using a processor to determine usage frequency and resource requirements of at least one application;
    benchmarking captured user action events to simulate a user workload for the at least one application to determine how resource utilization and execution times scale from a legacy environment to a virtualized environment;
    determining one or more scaling factors to produce a plan to provision for legacy services in the virtualized environment; and
    transforming the legacy device into the virtualized environment in accordance with the plan.

11. The computer readable storage medium as recited in claim 10, wherein gathering profiling data includes determining application level resource statistics of the legacy system including at least one of characteristics of specific applications; number, speed, type and utilization of processors; size and utilization of memory; size and utilization of local disks; utilization of network interfaces; names, user/owner, command line arguments; utilization of computer processing unit, memory, and network for all processes.

12. The computer readable storage medium as recited in claim 10, wherein gathering profiling data includes gathering information from a representative number of legacy devices.

13. The computer readable storage medium as recited in claim 10, further comprising constructing plans to migrate to multiple models in the virtual environment from the legacy devices based upon the profiling data.

14. The computer readable storage medium as recited in claim 13, wherein the multiple models include a shared services model, a virtualized desktop model, and a dedicated server model.

15. The computer readable storage medium as recited in claim 10, wherein determining one or more scaling factors includes determining scaling factors based on performance and utilization measurements in the profiling data.

16. The computer readable storage medium as recited in claim 15, wherein the performance and utilization measurements in the profiling data include stored artifacts of user events and times between events.

17. The computer readable storage medium as recited in claim 10, wherein benchmarking includes recording and replaying user events to match screen buffer regions to playlists to determine when a user action has completed to proceed to a next action.

18. The computer readable storage medium as recited in claim 10, further comprising disaggregating a legacy device and delivering a same set of services to a user of the legacy device by employing multiple virtualization technologies.

19. A system for planning and transforming legacy devices into a virtualized environment, comprising a computer readable storage medium, further comprising:
   a user profiling module configured to gather profiling data over time to represent legacy device activities and analyze the profiling data for system applications and user applications to determine usage frequency and resource requirements of at least one application, the profiling module including a program application implemented from a storage medium for collecting profiling data and running on a legacy device;
   a benchmarking module configured to capture user action events to simulate a user workload for the at least one application to determine how resource utilization and execution times scale from a legacy environment to a virtualized environment;
   a transformation planner configured to employ scale factors from the benchmarking module to produce a plan to provision for legacy services in the virtualized environment; and
   a transformation executor configured to execute the plan to provide services for the legacy device within the virtualized environment.

20. The system as recited in claim 19, wherein the user profiling module includes memory storage for application level resource statistics of the legacy system including statistics for at least one of: characteristics of specific applications; number, speed, type and utilization of processors; size and utilization of memory; size and utilization of local disks; utilization of network interfaces; names, user/owner, command line arguments; utilization of computer processing unit, memory, and network for all processes.

21. The system as recited in claim 19, wherein profiling data includes information from a representative number of legacy devices.

22. The system as recited in claim 19, wherein the transformation planner constructs plans to migrate a legacy device to one or more of multiple models in the virtual environment based upon the profiling data, knowledge and models and benchmark information.

23. The system as recited in claim 22, wherein the multiple models include a shared services model, a virtualized desktop model, and a dedicated server model.

24. The system as recited in claim 19, wherein the benchmarking module determines scaling factors based on performance and utilization measurements in the profiling data.

25. The system as recited in claim 24, wherein the performance and utilization measurements in the profiling data include stored artifacts of user events and times between events.

26. The system as recited in claim 19, wherein the benchmarking module includes memory configured to record and replay user events to match screen buffer regions to playlists to determine when a user action has completed to proceed to a next action.

* * * * *